Patented Feb. 7, 1950

2,496,736

UNITED STATES PATENT OFFICE 2,496,736

MANUFACTURE OF PRECIPITATED SILICA

William T. Maloney, Clinton, N. Y.

No Drawing. Application October 10, 1942,
Serial No. 461,629

5 Claims. (Cl. 23—182)

This invention relates to an improved process of preparing precipitated silica from alkali silicate solutions. More particularly the invention includes the preparation of a precipitated silica product characterized by very high oil adsorptivity and its ability to serve as a filtering medium in purifying water and similar liquids.

The invention includes as a further feature the recovery of sodium sulphate as a useful by-product at greatly reduced cost as compared with what was possible following the prior practices.

In preparing precipitated silica for various adsorption purposes such as for adsorbing gases and vapors, for clarifying and decolorizing liquids, etc., it has been customary to so conduct the precipitation as to produce a colloidal solution or hydrosol of the silica which on standing is transferred into a gelatinous mass, hydrogel, containing besides the gelatinous silica a soluble salt of sodium or other alkali or other basic radical present in the soluble silicate that has been reacted with acid to produce the hydrosol After this mass is treated to remove the soluble salt, it is dried to produce a hard vitreous material containing ultramicroscopic pores. The adsorbing properties of the gel are attributed to these pores and various expedients have been employed to increase the number and size of the pores for the purpose of improving the effectiveness of the silica for various purposes.

All of the procedures employed for producing silica gel have the drawback that the reacted mixture must be allowed to stand for a considerable period of time to permit the freshly precipitated silica to pass from the sol state into the form of the gelatinous hydrogel. It is then necessary to subject the gel to washing and drying treatments to remove the soluble salts present therein and to otherwise beneficiate the final gel product. The washing step requires large quantities of water and is a slow and tedious operation, and, finally, the drying of the gel after it has been freed from the other reaction products is time-consuming and expensive.

It has long been known that silica can be caused to precipitate immediately from aqueous silicate solutions in a hard granular form under certain conditions as to concentration and acidity of the solution, temperature, etc. However, in so far as appears from the prior art, the hard granular precipitated silica so produced was regarded as unsuited for absorbing or adsorptive purposes and, therefore, it was aimed to avoid those reacting conditions which would bring about the formation of a granular precipitate as distinguished from the gel form known commercially as silica gel For example, in his U. S. Patent No. 1,577,190, Patrick states that in producing silica gel by reacting a soluble silicate with an acid, it is "necessary to allow the silicic acid to set to a hydrogel in a medium of certain definite acid concentration in order to insure a gel of the proper strength." Patrick indicates that the concentration of the acid should be between 0.3 to 0.9 gram ions of hydrogen per liter and by way of example specifies the use of a 10% solution of hydrochloric acid and a sodium silicate solution of a specific gravity of from 1.1 to 1.3.

It has been proposed to produce a precipitated silica product for adsorption purposes without causing the precipitated silica to pass through the gel state, but in so far as I am aware all of the prior proposals have involved use of special reagents or the application of special processing steps to impart to the precipitated silica the desired adsorbent properties I have found, in contradistinction to the results reported by prior workers using relatively dilute solutions, that when an alkali silicate is reacted with sulfuric acid in controlled, relatively high concentrations, and under conditions of temperature control and agitation such that the reaction is caused to proceed very rapidly, the resulting product will be a finely divided, amorphous product having superior qualities as respects softness, oil adsorptivity, and other highly desirable characteristics My invention has for a further object the carrying on of the process in such a manner that the resulting alkali metal sulfate is recovered in the form of a solution of relatively high concentration, thus permitting it to be recovered as a valuable by-product with a marked economy in evaporating, crystallizing and drying costs.

According to one specific example, when a sodium silicate or water glass, having a sodium oxide-silica ratio of approximately 1:3.36 and of a Baumé gravity of 40–42°, is diluted with an equal amount by weight of water and the resulting solution is rapidly and intimately mingled with an equivalent amount of concentrated sulfuric acid, the resulting silica product will precipitate in finely divided, amorphous form. This product may then be filtered, preferably at the temperature of the mixture as it is led from the reaction zone. If the filtering is done after the mixture has been allowed to cool, I prefer to apply heat to the mixture to bring it to a temperature of at least 100° F. at the time of filtering. In this way the larger portion of the sodium sulfate will be separated as a relatively concentrated solution, which may be evaporated or crystallized in known manner. The filter cake containing the residue of the sulfate may then be washed with water or triturated and washed to recover the residue of the sodium sulfate and free the silica from impurities. The precipitated silica, when freed from the sodium sulfate, may be dried and ground or passed through rolls to break up any agglomerates formed in the course of the drying step.

The resulting silica product will be a finely divided, amorphous substance, characterized by capabilities and physical characteristics that distinguish it on the one hand from silica gel and on the other hand distinguish it from various other precipitated silica products which have been made available for adsorption and absorption purposes. It is distinguished from silica gels in appearance under the microscope in that instead of appearing to have been solidified as a solid homogenous glassy mass and then subsequently ground and exhibiting a typical conchoidal fracture, the structure of the average particle can best be described as a homogenous, glassy-like mass, with surfaces very irregular and contorted and deeply creviced with cracks. As viewed under the microscope the interior appears to be filled with capillary tubes, both straight and meandering, void areas, and shrinkage cracks. Some of the particles appear to have been drawn out in one direction and these usually have the capillary tubes also drawn out, the effect being similar to that found in pumice.

Refractive index determinations also reveal that the product differs markedly from silica gel as well as from various other precipitated silica products that have been proposed or are available on the market. As distinguished from a refractive index value of 1.443 for silica gel, my product shows a refractive index reading of about 1.462 to 1.463, the last figure being estimated in each case.

In staining tests conducted to determine adsorption characteristics, employing Ziehl's Carbol-Fuchsin diluted with water to about one-half strength, my product showed a greatly enhanced ability to hold the coloring matter as contrasted with silica gel. All samples were stained for three hours, then washed repeatedly in water under identical conditions until no color was shown in water after immersion of a sample therein. The washing was done in small white porcelain dishes, each sample being allowed to remain for about five minutes. In the case of silica gel the wash water was colorless at the eleventh washing whereas in samples of my product it was necessary to wash the sample from sixteen to twenty times before the wash water remained colorless after five minutes.

I have also observed that the precipitated silica produced in the manner I have above outlined possesses superior filtering characteristics in that the filter cake may be brought to a substantially greater degree of dryness than is the case of the product prepared by the processes heretofore employed when it is filtered under similar filtering conditions. A filter cake containing as much as 30% solids is obtainable, operating under ordinary filtering conditions. This characteristic makes for increased efficiency in the separation of the sodium sulfate from the precipitated silica, and also promotes recovery of a large part of the sulfate as a relatively concentrated solution.

The washings of sodium sulfate obtained in separating the residue after the initial filtering operation may be re-cycled by using them in effecting the dilution of the silicate or the concentrated sulfuric acid to the extent that is permissible and yet insure the precipitation of the silica in the desired form. In this way the expense of recovering the sulfate is further curtailed.

In carrying out the reaction of the concentrated acid and silicate solution, an acid resistant vessel should, of course, be used and advantageously the desired intermingling and agitation is effected by means of appropriate stirring apparatus.

While I have indicated that the silicate may be diluted to the extent of 50%, it will be understood that similar results may be obtained by using a more concentrated silicate solution up to a concentrated solution of 40–42° Baumé. In proportion to the use of a greater concentration of silicate solution, the acid may be used in a more dilute state.

I have also found that the desired results may be obtained by using a sodium silicate solution varying in concentration from a Baumé gravity of 40–42° down to 20°, with moderately dilute sulfuric acid, provided the temperature is appropriately increased. By way of example, I have found that by gradually adding a solution of one part of concentrated sulfuric acid (93%) and five parts of water, both by weight, to a concentrated sodium silicate, 40–42° Bé., diluted with an equal amount by weight of water, the desired silica product will be obtaind, provided the temperature is maintained throughout the reaction stage at 120° F. or higher and the silicate and acid are brought together under conditions of constant stirring or otherwise their intermingling is so controlled as not to permit a flocculent or jellied mass to form. In other words, conditions should be so maintained as to practically exclude any tendency for the precipitated silica to exist in the hydrosol state. By carrying on the reaction at a temperature of 120° F. or higher while agitating or stirring to insure quick and uniform intermingling of the acid and silicate solutions, the relative concentrations of the acid and silicate brought to the reaction stage may be varied considerably so long as care is taken to insure that there is present in the mixed solution, as such or as their reaction or dissociation products, at least about 204 grams of sodium silicate, calculated as $Na_2O.3.36\ SiO_2$, and 38 grams of $H_2SO_4$ per liter of the solution. If a sodium silicate containing different relative proportions of sodium oxide and silica or another soluble silicate, e. g., potassium silicate, is used, the desired results will be assured if the soluble silicate solution contains not less than about 160 grams of $SiO_2$ per liter and the sulfuric acid contains not less than 15.5% $H_2SO_4$ by weight.

Preferably, the sulfuric acid is added to the alkali silicate rather than vice versa, since in this way there is less tendency for the precipitated silica to take up a large amount of water or pass to the gelatinous hydrated state.

While I have indicated by specific examples the conditions of dilution, temperature and intermingling that I have found to be productive of the desired result, it will be understood that various modifications of the conditions are permissible. As regards dilution, it will be understood that it is not so important that each of the reagents shall be in a particular state or range of dilution when they are brought together as it is that the proportion of water present in the reaction zone shall not be sufficiently great to promote the formation of a silica gel as distinguished from a finely divided, non-gelatinous product. It will be further understood that when a more concentrated mixture is employed, it is not so necessary to apply heat, and when concentrated acid is used no additional heat need be applied.

As hereinbefore indicated, a filter cake of the precipitated silica containing 30% or more of solids may be obtained by following an ordinary filtering procedure. For some purposes it will suffice if the filter cake is further dried only sufficiently to free the product from uncombined water. For other purposes it is desirable to carry the drying or calcination further, and for some purposes complete dehydration is required. For example, if the product is to be used as a filler in rubber or as a paint ingredient, I prefer to subject the precipitated silica to a calcining treatment carried up to 250° C. When the precipitated silica is dried in this manner and then subjected to a micronizing or similar attrition or grinding treatment, a product having especially desirable properties for use as a filler in rubber will be obtained. On the other hand, if the product is to be used as a lake base in dyeing, then drying may be discontinued when the content of combined water has been brought down to around 10–15%.

In addition to the uses to which precipitated silica has heretofore been put, I have found that the product of my process is particularly effective as a purifying medium in treating water. Not only is it effective in removing organic color impurities but also it is particularly effective in removing iron and eliminating temporary hardness. When the product is to be used in water purification, I prefer to control the drying so as to leave about 5% of combined water. My silica product has the further desirable characteristic as a filtering medium in separating impurities from water and other liquids that liquids may be filtered through a mass of it at a relatively rapid rate.

In addition to the desirable characteristics hereinbefore noted, my product is characterized by its high oil adsorptivity. Tested according to the Gardner method, my product in the calcined state will show a linseed oil adsorption value of 350 or more.

Where herein I have referred to the use of an alkali silicate, it is to be understood that I mean to include the various silicates of sodium and potassium as well as other water soluble silicates that may be reacted with a strong acid to form a silica precipitate.

Where herein and in the claims I have referred to the separation of the precipitated silica from alkali sulfate and part of the water by filtering, it is to be understood that I have used the term "filtering" in a general sense and that other equivalent separating methods such as centrifuging may be employed.

It is to be understood that various changes in the details of the procedure and in the operating conditions may be made without departing from the invention, which is not to be deemed as limited except as required by the language of the appended claims.

I claim:

1. The process of preparing precipitated silica in the form of an amorphous, fine, granular product characterized by high oil adsorptivity, which comprises bringing an alkali metal silicate into contact with sulfuric acid in an aqueous solution, the proportions and concentrations of alkali silicate and sulfuric acid brought into said solution being at least 204 grams of sodium silicate, calculated as $Na_2O.3.36\ SiO_2$, and 38 grams of $H_2SO_4$ per liter of the solution, subjecting the reaction mixture to vigorous agitation while maintaining a temperature of at least 120° F. in the reaction zone and thereby causing precipitation of the silica and formation of alkali metal sulfate, and thereafter separating the silica from the sulfate, and drying the silica.

2. The process of preparing precipitated silica in the form of an amorphous, fine, granular product characterized by high oil adsorptivity, which comprises rapidly bringing about uniform intermingling of an alkali metal silicate solution which contains not less than 160 grams of $SiO_2$ per liter of solution, with sulfuric acid containing not less than 15.5% $H_2SO_4$ by weight, thereby causing precipitation of the silica content of the silicate, and at the same time so regulating the temperature in the reaction stage that the tendency of the silica to exist in the hydrosol state is substantially inhibited and said silica product is obtained in finely divided, amorphous form, thereafter separating the silica from the sulfate, and drying the silica.

3. The process of preparing precipitated silica in the form of an amorphous, fine, granular product characterized by high oil adsorptivity, which comprises bringing a sodium silicate solution which contains not less than 160 grams of $SiO_2$ per liter of solution into contact with sulfuric acid containing not less than 15.5% $H_2SO_4$ by weight, vigorously stirring the mixture and maintaining a temperature of at least 120° F. throughout the reaction stage and thereby causing precipitation of the silica in a finely pulverulent, amorphous form, thereafter separating the silica from the sulfate, and drying the silica.

4. The process of preparing a precipitated silica in the form of an amorphous, fine, granular product characterized by high oil adsorptivity, which comprises bringing a sodium silicate solution which contains not less than 160 grams of $SiO_2$ per liter of solution into contact with concentrated sulfuric acid while vigorously agitating the mixture, thereby forming sodium sulfate and causing precipitation of the silica in a finely divided, amorphous form, thereafter separating the silica from the sulfate, and drying the silica.

5. The process of preparing precipitated silica by reaction of an alkali metal silicate and sulfuric acid and at the same time recovering as a useful by-product the alkali metal sulfate formed in the process, which comprises rapidly bringing about a uniform intermingling of an alkali metal silicate solution which contains not less than 160 grams of $SiO_2$ per liter of solution and sulfuric acid containing not less than 15.5% $H_2SO_4$ by weight, and at the same time so regulating the temperature in the reaction zone that the tendency of the resulting silica to exist in the hydrosol state is substantially inhibited and said silica is precipitated in a fine, granular, amorphous form, filtering the resulting mixture while hot and thereby recovering a concentrated alkali metal sulfate solution, washing the precipitated silica to separate the residue of alkali metal sulfate, and using the washings so obtained to bring a further quantity of concentrated silicate to the dilution specified for the silicate-sulfuric acid reaction and then repeating the cycle of steps first above recited.

WILLIAM T. MALONEY.

REFERENCES CITED

The following references are of record in the file of this patent:

UNITED STATES PATENTS

| Number | Name | Date |
|---|---|---|
| 1,506,118 | Govers | Aug. 26, 1924 |
| 1,751,953 | Stoewener | Mar. 25, 1930 |
| 1,932,832 | Turrentine | Oct. 31, 1933 |
| 1,983,271 | Earle | Dec. 4, 1934 |
| 2,114,123 | Heuser | Apr. 12, 1938 |
| 2,198,527 | Curtin | Apr. 23, 1940 |
| 2,217,466 | Baylis | Oct. 8, 1940 |
| 2,218,053 | Schwabe | Oct. 15, 1940 |

FOREIGN PATENTS

| Number | Country | Date |
|---|---|---|
| 159,508 | Great Britain | Aug. 28, 1922 |
| 215,011 | Great Britain | May 14, 1924 |
| 299,483 | Great Britain | Oct. 29, 1928 |
| 503,968 | Great Britain | Apr. 18, 1939 |

OTHER REFERENCES

"Handbook of Chemistry and Physics," 28th ed., Chemical Pub. Co., Cleveland, Ohio, page 452.

"Condensed Chemical Dictionary," 3rd ed., Rembold Pub. Co., New York, N. Y., page 571.

Mellor, "Inorganic and Theoretical Chemistry," Longmans, Green and Co., N. Y., vol. 6 (1925), page 290.